United States Patent
Panchal et al.

(10) Patent No.: US 6,882,855 B2
(45) Date of Patent: Apr. 19, 2005

(54) METHOD AND APPARATUS FOR CDMA SOFT HANDOFF FOR DISPATCH GROUP MEMBERS

(75) Inventors: Rajendra A. Panchal, Algonquin, IL (US); Jay Jayapalan, Buffalo Grove, IL (US); Alexander Rozenstrauch, Buffalo Grove, IL (US)

(73) Assignee: Motorola, Inc., Schaumburg, IL (US)

( * ) Notice: Subject to any disclaimer, the term of this patent is extended or adjusted under 35 U.S.C. 154(b) by 149 days.

(21) Appl. No.: 10/434,848

(22) Filed: May 9, 2003

(65) Prior Publication Data

US 2004/0224711 A1 Nov. 11, 2004

(51) Int. Cl.[7] .................................................. H04B 7/00
(52) U.S. Cl. .................. 455/518; 455/517; 455/519; 455/520; 455/521; 455/525; 455/442; 455/436; 370/342; 370/335; 370/441
(58) Field of Search ............................. 455/518, 517, 455/519, 520, 521, 525, 442, 436; 370/342, 335, 441

(56) References Cited

U.S. PATENT DOCUMENTS

| | | | |
|---|---|---|---|
| 5,881,368 A | * | 3/1999 | Grob et al. ............... 455/69 |
| 5,884,196 A | * | 3/1999 | Lekven et al. ............ 455/574 |
| 5,887,252 A | | 3/1999 | Noneman |
| 5,914,958 A | | 6/1999 | Chinitz et al. |
| 6,178,166 B1 | | 1/2001 | Wilson et al. |
| 6,373,829 B1 | | 4/2002 | Vilmur |
| 6,519,239 B1 | | 2/2003 | Panchal et al. |
| 6,707,803 B1 | * | 3/2004 | Suk ........................... 370/331 |
| 2001/0030948 A1 | * | 10/2001 | Tiedemann ................ 370/305 |
| 2002/0181423 A1 | * | 12/2002 | Chen et al. ................ 370/337 |
| 2003/0036384 A1 | * | 2/2003 | Chen et al. ................ 455/437 |

FOREIGN PATENT DOCUMENTS

| | | | |
|---|---|---|---|
| EP | 000828355 A2 | * | 8/1997 |
| WO | WO 97/47094 | * | 12/1997 |

* cited by examiner

*Primary Examiner*—Nay Maung
*Assistant Examiner*—Angelica M. Perez
(74) *Attorney, Agent, or Firm*—Jeffrey K. Jacobs

(57) ABSTRACT

To address the need to provide listening participants of CDMA dispatch services soft handoff signaling capability, the concept of "shared channel signaling windows" for shared traffic channels (e.g., 110) is described. In one embodiment, the base site (105) announces the beginning of a signaling window for the traffic channel, allowing remote units (e.g., MS 120) that need to send handoff signaling an opportunity. In response to such signaling, the base site directs soft handoff information to the signaling remote units via the traffic channel. However, all the remote units that share the traffic channel can store this soft handoff information and later use the information to initiate soft handoffs without needing to exchange handoff messaging with the base site. Thus, a CDMA-dispatch, shared-channel implementation is enabled by providing soft handoff signaling windows and the over-the-air, soft-handoff messaging required for dispatch services is reduced.

28 Claims, 3 Drawing Sheets

content of US Patent 6,882,855 B2, columns 1–2 …

METHOD AND APPARATUS FOR CDMA SOFT HANDOFF FOR DISPATCH GROUP MEMBERS

REFERENCE(S) TO RELATED APPLICATION(S)

This application is related to a co-pending application entitled "METHOD AND APPARATUS FOR PROVIDING POWER CONTROL FOR CDMA DISPATCH SERVICES," filed on even date herewith, and assigned to the assignee of the instant application.

This application is related to a co-pending application, Ser. No. 10/027,488, entitled "METHOD AND APPARATUS FOR CDMA-DISPATCH SOFT HANDOFF," filed Dec. 20, 2001, which is assigned to the assignee of the present application.

This application is related to a co-pending application, Ser. No. 10/027,041, entitled "METHOD AND APPARATUS FOR MOBILE-INITIATED, CDMA-DISPATCH SOFT HANDOFF," filed Dec. 20, 2001, which is assigned to the assignee of the present application.

This application is related to a co-pending application, Ser. No. 10/027,465, entitled "METHOD AND APPARATUS FOR BASE-INITIATED, CDMA-DISPATCH SOFT HANDOFF," filed Dec. 20, 2001, which is assigned to the assignee of the present application.

This application is related to a co-pending application, Ser. No. 09/588,262, entitled "METHOD AND APPARATUS FOR SELECTING COMMUNICATION CELLS IN A WIRELESS COMMUNICATION SYSTEM," filed Jun. 6, 2002, which is assigned to the assignee of the present application.

This application is related to a co-pending application, Ser. No. 10/027,193, entitled "METHOD AND APPARATUS FOR QUICKLY ESTABLISHING A CDMA DISPATCH CALL," filed Dec. 20, 2001, which is assigned to the assignee of the present application.

This application is related to a co-pending application, Ser. No. 10/027,365, entitled "BASE SITE AND METHOD FOR QUICKLY ESTABLISHING A CDMA DISPATCH CALL," filed Dec. 20, 2001, which is assigned to the assignee of the present application.

This application is related to a co-pending application, Ser. No. 09/811,213, publication number US-2002-0131380-A1, entitled "METHOD AND APPARATUS FOR PROVIDING A DISPATCH PATCH SERVICE IN A CDMA COMMUNICATION SYSTEM," filed Mar. 16, 2001, which is assigned to the assignee of the present application.

This application is related to a co-pending application, Ser. No. 09/781,838, publication number US-2002-0110107-A1, entitled "CHANNEL STRUCTURE FOR DATA TRANSMISSION," filed Feb. 12, 2001, which is assigned to the assignee of the present application.

FIELD OF THE INVENTION

The present invention relates generally to communication systems and, in particular, to CDMA soft handoff for dispatch group members.

BACKGROUND OF THE INVENTION

The IS-95 and CDMA2000 standards are focused on supporting wireless telephone call service in today's cellular systems. However, in contrast to wireless telephone calls which usually involve two participants, wireless dispatch (or group) calls can involve three or more call participants. In a dispatch call, one mobile station (MS) transmits (i.e., in talk mode) while the other members of the group receive (i.e., in listening mode) at any given time. When the MS with the transmit prerogative releases its "Push-to-talk" (PTT), a message is sent to its base station (BS), and the BS places the traffic channel in an "open mode." While in this mode, any other MS can request a transmit prerogative by signaling a PTT. The BS allocates a transmit prerogative to the first arriving request. While this description is for a single-cell call, it can be applied to a multi-cell call with the addition of a central dispatch call controller, which arbitrates transmit prerogative requests instead of a controlling BS.

In a CDMA system such as that described in U.S. Pat. No. 6,519,239 (U.S. patent application Ser. No. 09/443,538), entitled "METHOD AND APPARATUS FOR PROVIDING DISPATCH SERVICE IN A CDMA COMMUNICATION SYSTEM," group call voice frames are transmitted using standard CDMA traffic channel procedures except that a common long code is used instead of an individual long code computed from the MS's ESN. Thus, the MSs in the group call share a single forward-link traffic channel, while the transmitting MS transmits via the corresponding reverse-link traffic channel. However, in a prior art system where only the transmitting MS uses the reverse-link traffic channel, listening mode MSs are unable to participate in the signaling required to effect a handoff. Therefore, a need exists for an apparatus and method to provide handoff for listening participants of CDMA dispatch services.

DETAILED DESCRIPTION OF EMBODIMENTS

To address the need to provide listening participants of CDMA dispatch services soft handoff signaling capability, the concept of "shared channel signaling windows" for shared traffic channels is described. In one embodiment, the base site announces the beginning of a signaling window for the traffic channel, allowing remote units that need to send handoff signaling an opportunity. In response to such signaling, the base site directs soft handoff information to the signaling remote units via the traffic channel. However, all the remote units that share the traffic channel can store this soft handoff information and later use the information to initiate soft handoffs without needing to exchange handoff messaging with the base site. Thus, a CDMA-dispatch, shared-channel implementation is enabled by providing soft handoff signaling windows and the over-the-air, soft-handoff messaging required for dispatch services is reduced.

Figure 1:
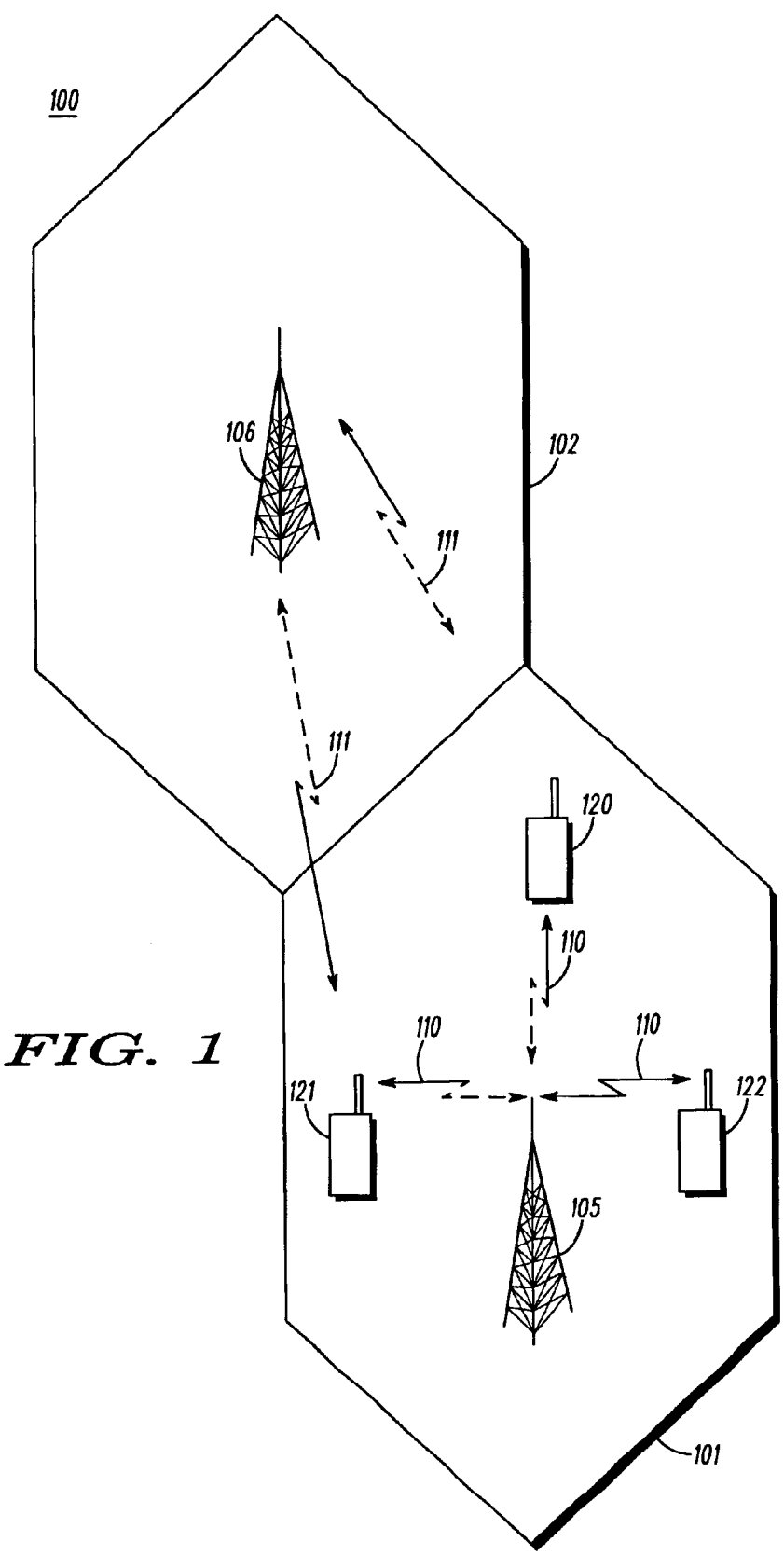
FIG. 1 is a block diagram depiction of a communication system in accordance with an embodiment of the present invention.

The disclosed embodiments can be more fully understood with reference to FIGS. 1–4. FIG. 1 is a block diagram depiction of a communication system 100 in accordance with a first embodiment of the present invention. Communication system 100 is a well-known Code Division Multiple Access (CDMA) system, specifically a CDMA2000 system, which is based on the Telecommunications Industry Association/Electronic Industries Association (TIA/EIA) standard IS-2000, suitably modified to implement the present invention. (The TIA/EIA can be contacted at 2001 Pennsylvania Ave. NW, Washington, D.C. 20006). In various embodiments, communication system 100 may utilize other cellular communication system protocols such as, but not limited to, IS-95.

Communication system 100 includes radio access network (RAN) entities, such as base sites (BSs) 105 and 106, each of which comprise one or more base transceiver stations (BTSs). BSs 105 and 106 have service coverage areas 101 and 102, respectively, and utilize air interface resources 110 and 111. Communication system 100 also includes remote units 120–122. However, the present invention is not limited to remote units that are mobile. Typically, a remote unit comprises a mobile station (MS), but it may instead comprise, for example, a desktop computer wirelessly connected to the RAN.

Those skilled in the art will recognize that FIG. 1 does not depict all of the network equipment necessary for system 100 to operate but only those system blocks and logical entities particularly relevant to the description of embodiments of the present invention. Those skilled in the art are aware of the many types of communication devices necessary for system 100 operation. Furthermore, those skilled in the art are aware of the many ways these entities can be implemented and/or purchased from wireless communications companies such as "MOTOROLA."

Figure 2:
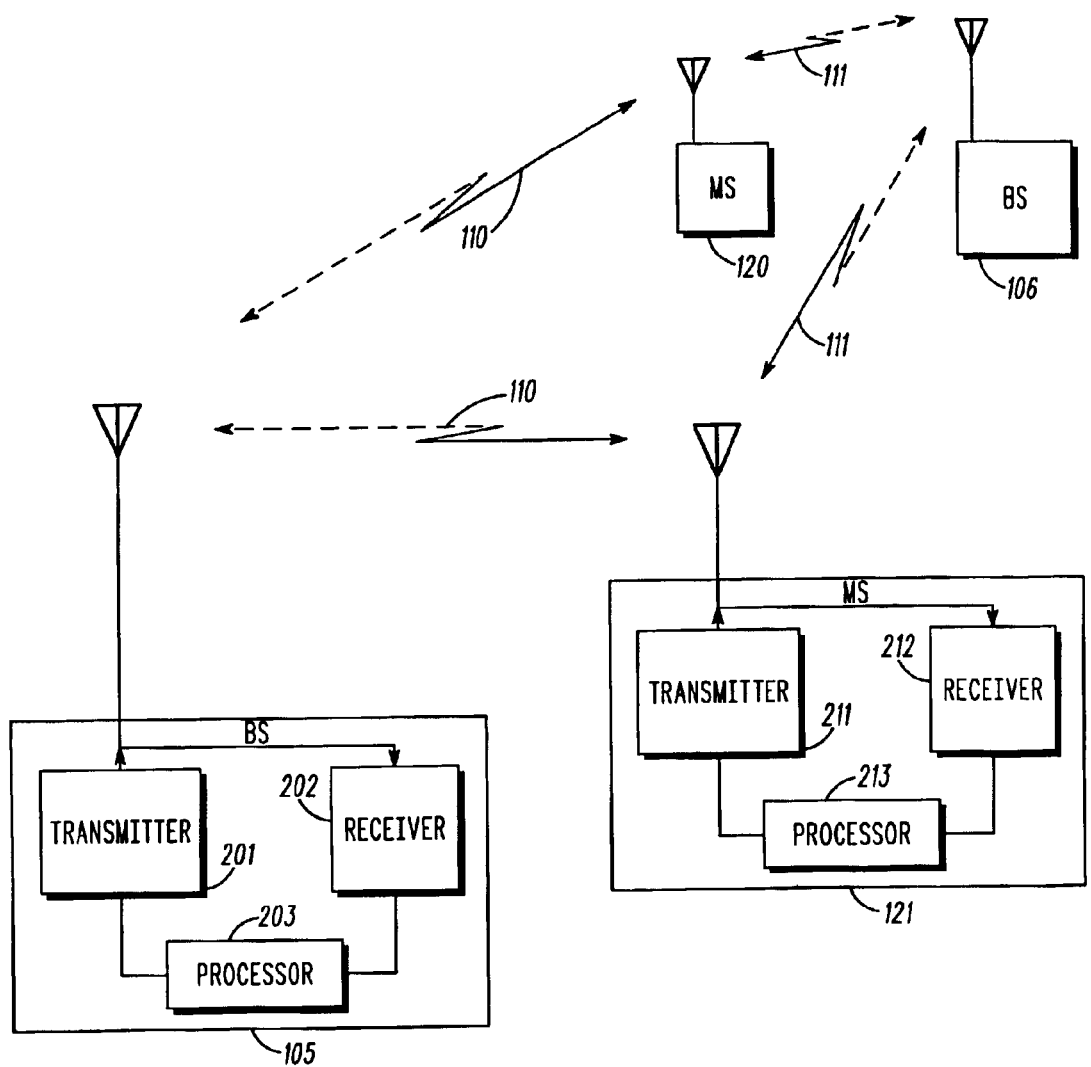
FIG. 2 is a block diagram depiction of base sites and mobile stations in accordance with an embodiment of the present invention.

FIG. 2 is a block diagram depiction of BSs 105 and 106 and MSs 120 and 121 in accordance with the first embodiment of the present invention. BS 105 and MSs 120 and 121 communicate via air interface resource 110, and BS 106 and MSs 120 and 121 communicate via air interface resource 111. In the first embodiment, air interface resources 110 and 111 each comprise a CDMA traffic channel for which a common long code is used instead of a CDMA2000 individual long code computed from an ESN. The use of a common long code is described in detail in U.S. Pat. No. 6,519,239 (U.S. patent application Ser. No. 09/443,538), referenced above. The use of a common long code allows MSs 120–122 to share traffic channel (TCH) 110, and MSs 120 and 121 to share TCH 111.

MS 121 and BS 105 comprise well-known entities such as processors 203 and 213, transmitters 201 and 211, and receivers 202 and 212. Processors, for example, typically comprise components such as microprocessors, digital signal processors, memory, and/or logic circuitry designed to implement algorithms that have been expressed as computer instructions and/or in circuitry. Given an algorithm or a logic flow, those skilled in the art are aware of the many design and development techniques available to implement a processor that performs the given logic. In the first embodiment of the present invention, a known CDMA 2000 BS is adapted using known telecommunications design and development techniques to implement the logic flow depicted in FIG. 3. The result is BS 105. Similarly, a known CDMA 2000 MS is adapted using known telecommunications design and development techniques to implement the logic flow depicted in FIG. 4. The result is MS 121.

Operation of the first embodiment of the present invention occurs substantially as follows. MSs 120–122 are members of a dispatch group. Receiver 202 of BS 105 receives content for the dispatch group from a talking dispatch group member (MS 122) via traffic channel (TCH) 110. This content may include, for example, dispatch group call voice, video, data, text messaging, or any combination of these in the form of broadcast, multicast, or unicast information. The content transmitted by talking MS 122 is retransmitted by BS 105 via the forward link of TCH 110 and received by listening MSs 120 and 121 (via receiver 212).

When processor 203 of BS 105 detects inactivity in the dispatch content, processor 203 sends, via transmitter 201, an indication to the dispatch group that soft handoff signaling by non-talking (i.e., listening mode) dispatch group members may be transmitted via TCH 110 for a period of time. A Pilot Strength Measurement Message (PSMM) is one example of such soft handoff signaling.

There are at least two types of inactivity detected by BS 105: a relative silence in dispatch group call voice activity and an indication from the talking dispatch group member that another group member may talk. MSs transmit voice at different rates depending on the voice activity. Active voice is transmitted at full rate and half rate, while low activity voice or relative silence is transmitted at quarter rate and eighth rate. Consequently, the BS can detect a low activity or silence period (e.g., via Rate Determination Algorithm (RDA)) by the frame rate. Thus, BS 105 can detect inactivity when at least one eighth rate frame is detected in the dispatch content.

BS 105 schedules a signaling window so as to minimally affect voice quality. Once low activity/relative silence is detected, the BS issues a "Temporary Transmit Prerogative Suspension" message utilizing a Blank&burst or Dim&burst voice frame coded with TCH 110's common long mask. MSs 120–122 decode it and interpret the message as an indication to perform soft handoff signaling. The "Temporary Transmit Prerogative Suspension" expires after either an indicated or pre-defined number of voice frames (or period of time), and MS 122 then resumes transmitting its voice frames.

Another type of inactivity detected by BS 105 is an indication from the talking dispatch group member (MS 122) that another group member may talk, e.g., a push-to-talk (PTT) release indication. In dispatch call control, after receiving a PTT release from the talking MS, the BS transmits an Order message telling the group MSs that the channel is in an OPEN MODE. Since there is a considerable amount of time between the detection of an open channel by the MS and another user requesting PTT (i.e., requesting a transmit prerogative), this interval lends itself as another soft handoff signaling window. Thus, similar to the "Temporary Transmit Prerogative Suspension" message, an Order message can also indicate that soft handoff signaling may be transmitted. It is possible that a silence or a low activity period preceding the talker releasing PTT may cause the BS to signal a "Temporary Transmit Prerogative Suspension" window prior to the channel going to an OPEN MODE. In these cases, the window can be extended during the OPEN MODE to allow MSs with higher transmit time delays (as discussed below) to transmit.

In an alternative embodiment, the talking member of a dispatch group may be connected to a BS via a wireline connection instead of an air interface connection. Such an architecture may be employed to support equipment such a dispatcher, multi-media server, etc. In the case of a wireline connection, the BS keeps the assigned (reverse) TCH in an open-for-signaling mode (by issuing an ORDER), for as long as the wireline member of the dispatch group holds a transmit prerogative.

Listening MSs 120 and 121 receive the dispatch content via TCH 110's forward link and each compute frame error rates (FERs) for the content on the forward link. The FERs are compared to a threshold when each MS receives the indication that soft handoff signaling may be transmitted. In the first embodiment, this threshold is set to a value of 3% since voice usually cannot tolerate more errors; however, certainly this value can be tuned for more optimal performance in other embodiments. If the threshold is exceeded, the MS determines a transmit delay based on the FER. Since all listening MSs are also comparing their FERs to the threshold, only those with excessive FERs compete for the signaling window by determining a transmit delay. This delay is used to reduce the probability of collision on the common traffic channel. However, depending on the window size, the computed transmit delay may in reality amount to a boolean transmit or not indicator, such as when the computed delay does not fit into the window.

Ideally, the MSs compute their transmission delay in such a way that the MS with the highest FER computes the shortest delay. In general, however, a greater transmit delay is determined for a smaller frame error rate. Additional thresholds may be tiered in to map FER ranges to transmit delays. In fact, a highest threshold may be used, above which, the transmit delay is determined to be zero.

As described above, then, MS 120 delays transmission of its soft handoff signaling based on the transmit delay determined. After delaying and assuming the transmit delay is within the signaling window, MS 120 transmits and BS 105 receives the soft handoff signaling via TCH 110. As mentioned above this soft handoff signaling may comprise, for example, a Pilot Strength Measurement Message (PSMM). For purposes of this detailed description, the PSMM can be seen as triggered by a BS 106 pilot signal exceeding MS 120's T_ADD threshold.

In response to receiving soft handoff signaling from MS 120, processor 203, via transmitter 201 and TCH 110, sends soft handoff information that is directed to MS 120. Since this soft handoff information is sent in response to the PSMM, it may take the form of a Handoff Directed Message, which identifies a traffic channel at BS 106 that can be used for soft handoff (i.e., TCH 111). However, soft handoff information could alternatively take the form of a Neighbor List Update Message, for example.

Although the soft handoff information is directed to MS 120, BS 105 sends it via shared TCH 110. Thus, other MSs sharing TCH 110 can receive the soft handoff information. For example, processor 213 of MS 121 receives the information via receiver 212 and TCH 110 and stores the identity of the BS 106 traffic channel, TCH 111, and/or other soft handoff information directed to MS 120, such as that contained in a Neighbor List Update Message.

As MS 121 continues monitoring its neighbor list pilots (and for the purposes of this detailed description), MS 121 can be said to determine that the signal strength of a BS 106 pilot exceeds MS 121's T_ADD threshold. Under prior art operation, MS 121 would proceed with sending its own PSMM to BS 105 indicating the strong signal strength of the pilot. However, in embodiments of the present invention, MS 121, already aware of TCH 111, initiates a soft handoff using TCH 111 without transmitting its own PSMM or having to receive its own (i.e., directed to MS 121) Handoff Directed Message from BS 105.

Figure 3:
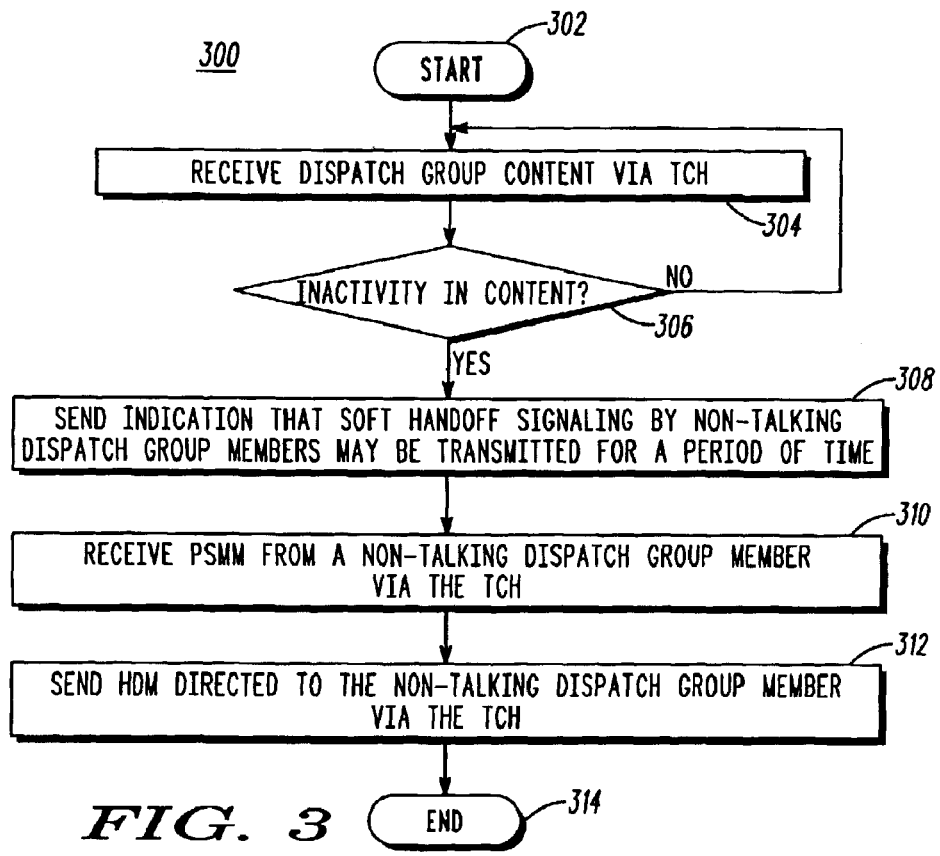
FIG. 3 is a logic flow diagram of a method executed by a base site in accordance with an embodiment of the present invention.

FIG. 3 is a logic flow diagram of a method executed by a base site in accordance with the first embodiment of the present invention. Logic flow 300 begins (302) with the base site receiving (304) dispatch group content via a TCH common to the group, i.e., shared by the group. When (306) the base site detects sufficient inactivity in the received content, it transmits (308) an indication to the non-talking group members that soft handoff signaling may be transmitted for a period of time. In response, the base site receives (310) soft handoff signaling (a PSMM, for example) from at least one non-talking dispatch group member via the common traffic channel. The base site responds to this soft handoff signaling by sending (312) soft handoff information, such as an HDM, to the dispatch group member. Although, this soft handoff information is directed to the group member, it is sent via the common traffic channel. Logic flow 300 thus ends (314).

Figure 4:
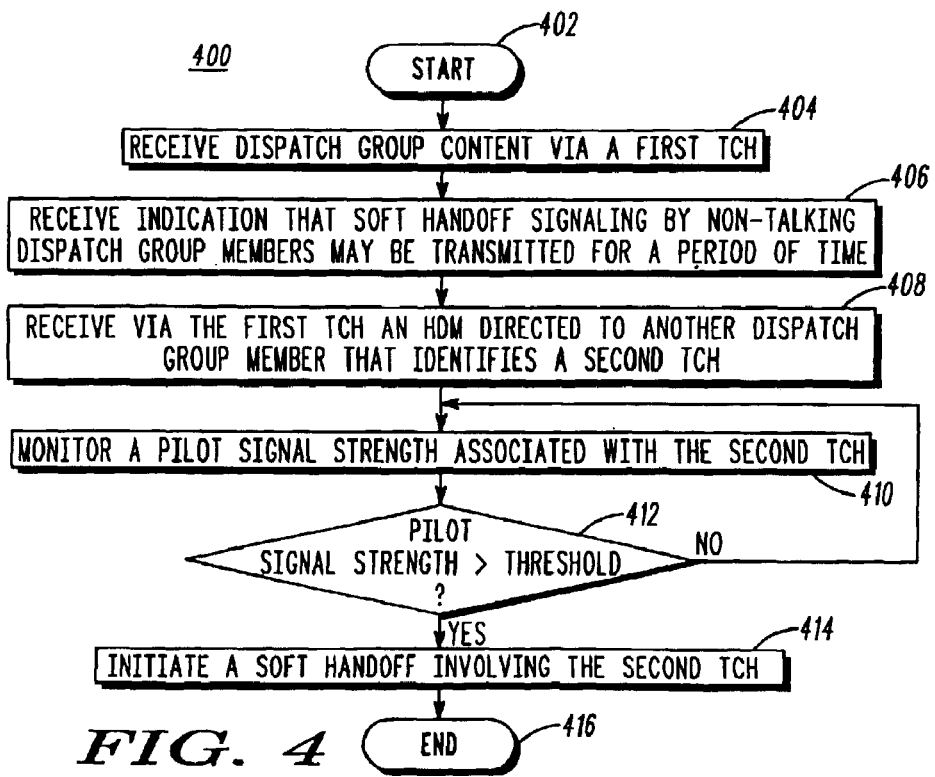
FIG. 4 is a logic flow diagram of a method executed by a remote unit in accordance with an embodiment of the present invention.

FIG. 4 is a logic flow diagram of a method executed by a remote unit in accordance with an embodiment of the present invention. Logic flow 400 begins (402) with the remote unit receiving (404) dispatch group content via a traffic channel common to the group. At some point, the remote unit receives (406) an indication that soft handoff signaling by non-talking group members may be transmitted for a period of time. Subsequently, the remote unit receives (408) soft handoff information that is directed to another dispatch group member. Although, this soft handoff information is directed to another group member, it is sent via the common traffic channel and can thus be received by the remote units sharing the channel. The soft handoff information may comprise a HDM, for example, that identifies a new traffic channel targeted for soft handoff.

While the remote unit monitors pilot signals as part of its normal operation, it may begin (or continue) monitoring (410) a pilot associated with the new traffic channel. If (412) the signal strength of this pilot exceeds a threshold (such as a T_ADD threshold), the remote unit can initiate a soft handoff involving the new traffic channel without having to exchange messaging with its base site. Logic flow 400 thus ends (416). In this manner, group members sharing a common traffic channel, need not individually perform the prior art signaling with their base site before initiating a soft handoff. The soft handoff information for the first remote unit is efficiently reused by subsequent units, thereby reducing over-the-air signaling and conserving system resources.

In the foregoing specification, the present invention has been described with reference to specific embodiments. However, one of ordinary skill in the art will appreciate that various modifications and changes may be made without departing from the spirit and scope of the present invention as set forth in the appended claims. Accordingly, the specification and drawings are to be regarded in an illustrative rather than a restrictive sense, and all such modifications are intended to be included within the scope of the present invention. In addition, those of ordinary skill in the art will appreciate that the elements in the drawings are illustrated for simplicity and clarity, and have not necessarily been drawn to scale. For example, the dimensions of some of the elements in the drawings may be exaggerated relative to other elements to help improve an understanding of the various embodiments of the present invention.

Benefits, other advantages, and solutions to problems have been described above with regard to specific embodiments of the present invention. However, the benefits, advantages, solutions to problems, and any element(s) that may cause or result in such benefits, advantages, or solutions, or cause such benefits, advantages, or solutions to become more pronounced are not to be construed as a critical, required, or essential feature or element of any or all the claims.

As used herein and in the appended claims, the term "comprises," "comprising," or any other variation thereof is intended to refer to a non-exclusive inclusion, such that a process, method, article of manufacture, or apparatus that comprises a list of elements does not include only those elements in the list, but may include other elements not expressly listed or inherent to such process, method, article of manufacture, or apparatus. The terms a or an, as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically. The term program, as used herein, is defined as a sequence of instructions designed for execution on a computer system. A program, or computer program, may include a subroutine, a function, a procedure, an object method, an object implementation, an executable application, an applet, a servlet, a source code, an object code, a shared library/dynamic load library and/or other sequence of instructions designed for execution on a computer system.

What is claimed is:

1. A method of CDMA soft handoff for dispatch group members comprising:
   receiving, by a first dispatch group member, dispatch group content via a first traffic channel;
   receiving, by the first dispatch group member, an indication to dispatch group members that soft handoff signaling may be transmitted via the first traffic channel;
   receiving, by the first dispatch group member via the first traffic channel, soft handoff signaling directed to a second dispatch group member; and
   initiating, by the first dispatch group member, a soft handoff involving a second traffic channel, wherein the identity of the second traffic channel was indicated by the soft handoff signaling directed to the second dispatch group member and wherein the soft handoff is initiated without receiving a Handoff Directed Message directed to the first dispatch group member.

2. The method of claim 1, wherein soft handoff signaling comprises a Handoff Directed Message for the second dispatch group member.

3. The method of claim 2, wherein soft handoff signaling further comprises a Neighbor List Update Message.

4. The method of claim 1, further comprising monitoring, by the first dispatch group member, a signal strength of a pilot signal associated with the second traffic channel, wherein initiating the soft handoff involving the second traffic channel is performed when the signal strength of the pilot signal exceeds a threshold.

5. The method of claim 4, wherein initiating the soft handoff involving the second traffic channel is performed without transmitting a Pilot Strength Measurement Message (PSMM) for the pilot signal by the first dispatch group member.

6. The method of claim 1, wherein receiving the indication that soft handoff signaling may be transmitted comprises receiving an indication that soft handoff signaling may be transmitted for a period of time.

7. The method of claim 6, wherein the period of time is a fixed, pre-defined period of time.

8. The method of claim 1, wherein the indication that soft handoff signaling may be transmitted comprises a Temporary Transmit Prerogative Suspension message.

9. The method of claim 1, wherein the indication that soft handoff signaling may be transmitted comprises an Order message indicating a dispatch open mode.

10. The method of claim 1, wherein dispatch group content comprises content selected from the group consisting of dispatch group call voice, video, data, and text messaging.

11. A method for providing CDMA soft handoff for dispatch group members comprising:
    receiving content for a dispatch group from a talking dispatch group member via a traffic channel;
    when inactivity is detected in the dispatch content, sending an indication to the dispatch group that soft handoff signaling by non-talking dispatch group members may be transmitted; and
    in response to sending the indication, receiving soft handoff signaling from a non-talking dispatch group member via the traffic channel.

12. The method of claim 11, wherein sending an indication that soft handoff signaling may be transmitted comprises sending an indication that soft handoff signaling may be transmitted for a period of time.

13. The method of claim 12, wherein the period of time is a fixed, pre-defined period of time.

14. The method of claim 11, wherein inactivity in the dispatch content comprises a relative silence in dispatch group call voice activity.

15. The method of claim 14, wherein the indication that soft handoff signaling may be transmitted comprises a Temporary Transmit Prerogative Suspension message.

16. The method of claim 11, wherein inactivity is detected in the dispatch content when at least one eighth rate frame is detected in the dispatch content.

17. The method of claim 11, wherein inactivity in the dispatch content comprises an indication from the talking dispatch group member that another group member may initiate dispatch content signaling.

18. The method of claim 17, wherein the indication from the talking dispatch group member that another group member may initiate dispatch content signaling comprises an indication from the talking dispatch group member of a push-to-talk (PTT) release.

19. The method of claim 18, wherein the indication that soft handoff signaling may be transmitted comprises an Order message indicating a dispatch open mode.

20. The method of claim 11, wherein allocation of a transmit prerogative to a wireline dispatch group member comprises an indication from the talking dispatch group member that another group member may initiate dispatch content signaling.

21. The method of claim 11, wherein soft handoff signaling from the non-talking dispatch group member comprises a Pilot Strength Measurement Message (PSMM).

22. The method of claim 11, further comprising sending soft handoff information directed to the non-talking dispatch group member via the traffic channel, in response to receiving soft handoff signaling from the non-talking dispatch group member.

23. The method of claim 22, wherein the soft handoff information identifies a second traffic channel.

24. The method of claim 23, wherein the soft handoff information comprises a Handoff Directed Message.

25. The method of claim 24, wherein the soft handoff information further comprises a Neighbor List Update Message.

26. A remote unit comprising:
    a receiver; and
    a processor, coupled to the transmitter and the receiver, adapted to receive dispatch group content via a first traffic channel, receive an indication to dispatch group members that soft handoff signaling may be transmitted via the first traffic channel, receive via the first traffic channel soft handoff signaling directed to a second dispatch group member, and initiate a soft handoff involving a second traffic channel, wherein the identity of the second traffic channel was indicated by the soft handoff signaling directed to the second dispatch group member and wherein the soft handoff is initiated without receiving a Handoff Directed Message directed to the first dispatch group member.

27. A base site comprising:

a transmitter;

a receiver; and a processor, coupled to the transmitter and the receiver, adapted to receive, via the receiver, content for a dispatch group from a talking dispatch group member via a traffic channel, send, via the transmitter and when inactivity is detected in the dispatch content, an indication to the dispatch group that soft handoff signaling by non-talking dispatch group members may be transmitted, and receive, via the receiver and in response to sending the indication, soft handoff signaling from a non-talking dispatch group member via the traffic channel.

28. The base site of claim 27, wherein the processor is further adapted to send, via the transmitter and in response to receiving soft handoff signaling from the non-talking dispatch group member, soft handoff information directed to the non-talking dispatch group member via the traffic channel.

* * * * *